Sept. 26, 1972   J. C. AKFIRAT ET AL   3,694,182
GLASS TEMPERING DIE CONSTRUCTION
Original Filed Nov. 21, 1968
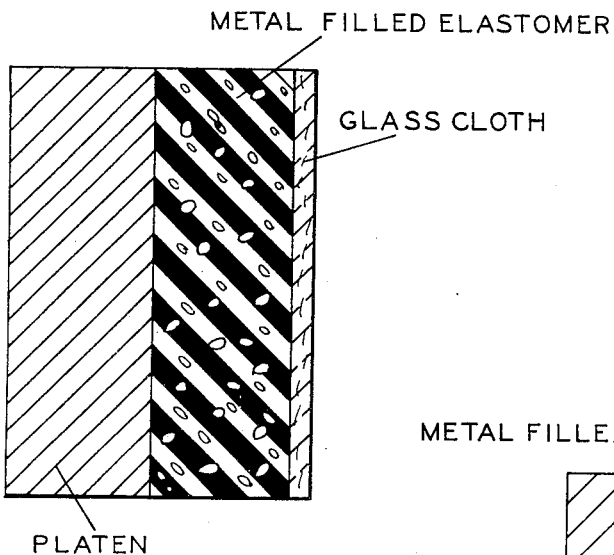
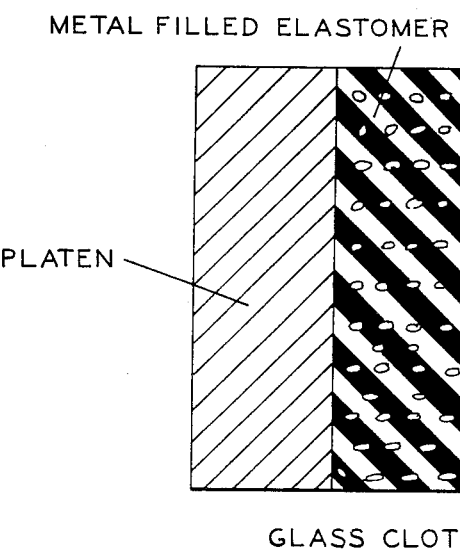
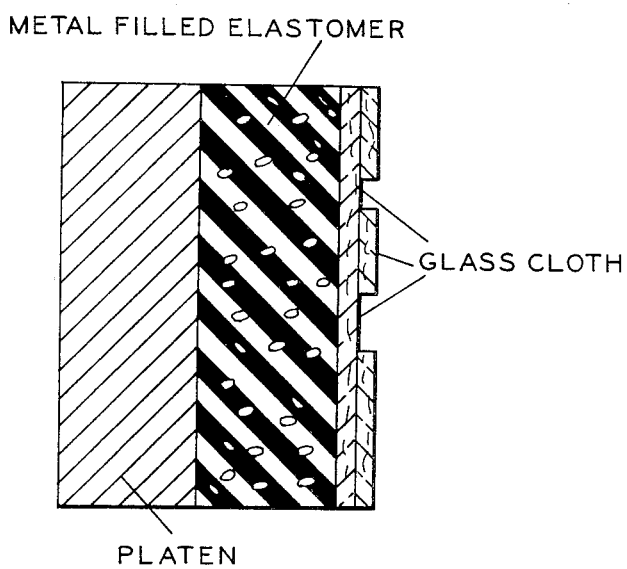
INVENTORS
JOHN C. AKFIRAT
ROBERT GARDON
BY
ATTORNEYS United States Patent Office 3,694,182
Patented Sept. 26, 1972

3,694,182
GLASS TEMPERING DIE CONSTRUCTION
John C. Akfirat, Dearborn, and Robert Gardon, Farmington, Mich., assignors to Ford Motor Company, Dearborn, Mich.
Continuation of abandoned application Ser. No. 777,883, Nov. 21, 1968. This application Apr. 20, 1971, Ser. No. 135,770
Int. Cl. C03b 27/00
U.S. Cl. 65—288      14 Claims

ABSTRACT OF THE DISCLOSURE

A die used for a glass tempering apparatus in which the die is brought into contact with the glass to be tempered has at least the following structural components. A rigid supporting platen forms a portion of the glass tempering apparatus. This platen has a layer of metal-filled, relatively deformable elastomeric material secured thereto. A thin glass cloth fabric covers the surface of the elastomeric material which is brought into contact with the glass during the tempering operation.

This application is a continuation of Ser. No. 777,883, filed Nov. 21, 1968, now abandoned.

BACKGROUND OF THE INVENTION

Already known in the art of thermally tempering sheet glass is a processing method which includes the steps of heating the glass sheet to a temperature above its strain point and thereafter rapidly removing heat from the glass by impingement of jets of a cold fluid thereon. The rapid removal of heat from the surfaces of the glass sheet establishes a temperature differential between the surfaces of the glass sheet and its interior as the glass cools through the critical temperature range necessary to temper the glass. The glass sheet will have temper stresses therein at room temperature. The tempered glass sheet will be in compression adjacent each surface thereof and in tension in the central portion thereof. Glass thus tempered has an enhanced mechanical strength and, when broken, will fracture into small blunt particles.

It has also been known that a glass sheet may be tempered by contacting the same with cooled solid dies. Materials previously proposed for use in such dies are rigid materials such as graphite or aluminum. These materials generally did not contact the glass uniformly over its entire extent because of the unevenness of the glass surface and the difficulty of obtaining a smooth, flat surface on the solid material. Also, all rigid materials have a tendency to bow or warp when one surface of a die constructed therefrom is brought into contact with a heated glass while the other surface thereof is in contact with a cooling medium designed to remove heat from the material. Under such conditions the rigid die material bows outwardly with its central portion being extended the greatest. In the bowed condition the rigid die makes good thermal contact only with the central portion of the glass sheet to be tempered. As a result of this type of contact pattern, the center of the glass sheet will be tempered properly but most of the remaining portion of the sheet will not be tempered.

SUMMARY OF THE INVENTION

This invention relates to a relatively deformable die construction for a die utilized in a glass tempering apparatus and, more particularly, to a die construction for such an apparatus which allows the die to be brought into uniform contact with the entire surface of a glass sheet to be tempered during the tempering operation.

A glass tempering die constructed in accordance with the teachings of this invention has a rigid supporting platen forming a part of the glass tempering apparatus. This platen has a layer of metal-filled, relatively deformable elastomeric material secured thereto. A thin glass cloth fabric covers the surface of the elastomeric material which is brought into contact with the glass during the tempering operation.

In greater detail, the metal-filled, elastomeric material contains between 10% to 70% by volume of copper powder. The elastomeric portion of the material is a soft, silicon rubber. In still greater detail, the copper powder consists of discrete particles of copper having a diameter of 4 to 10 microns and the composite material has a density of approximately 300 pounds per cubic foot, a thermal conductivity of about 1 B.t.u.-ft./hr. (ft.$^2$)° F. and a volumeric specific heat of about 30 B.t.u./ft.$^3$(° F.).

In other embodiments of the die construction of this invention, a pair of dies are utilized in conjunction with each piece of glass to be tempered. In a first case, one die has a greater thickness of glass cloth thereon than the other die of the pair. In a second case, one die has a greater amount of metal fill throughout its entire extent than the other die of the pair. In each of these cases, the utilization of the pair of dies to temper a glass sheet produces a glass sheet which will assume a bowed configuration after the tempering operation.

In still another embodiment of the die construction of this invention, a pair of matched, curved dies are utilized in conjunction with each piece of glass to be tempered. In this case the dies bend the glass to a desired shape simultaneously with the tempering of the glass.

BRIEF DESCRIPTION OF THE DRAWINGS

FIG. 1 is a diagrammatic, cross section view of one embodiment of this invention. FIG. 2 is a diagrammatic, cross section view of a second embodiment of this invention. FIG. 3 is a diagrammatic, cross section view of a third embodiment of the structure of this invention.

DESCRIPTION OF THE PREFERRED EMBODIMENT

In accordance with the teachings of this invention, a glass sheet is tempered in the following manner. A glass sheet, such as a ⅛ inch thick sheet of soda-lime glass, is heated to a temperature above its strain point. In the case of a soda-lime glass sheet, the glass is heated to an initial temperature above 1250° F. The glass sheet is then located between a pair of opposed dies constructed in accordance with the teachings of this invention. The opposed dies are closed on the glass sheet held therebetwen and the dies remove heat rapidly from the sheet to produce a glass sheet which is tempered.

In accordance with the teachings of this invention, each of the dies utilized in the tempering operation is constructed in the following manner and is illustrated generally in FIG. 1. A rigid supporting platen is provided which is movably secured to the tempering apparatus through suitable structure members. One side of the platen is cooled by a cooling medium to remove heat from the die structure. The other side of the platen has a layer of a metal-filled, relatively deformable elastomeric material secured thereto. A glass cloth fabric covers the surface of the elastomeric material which is to engage the glass sheet during the tempering operation.

The heat removed from the glass sheet during the tempering operation by the dies is ultimately dissipated to some cooling medium which is brought into contact with the back of the rigid supporting platen of the die structure. In continuous operation, the temperature of the die will fluctuate. The mean temperature of the die must be both low enough to insure an adequately rapid removal of heat from the glass to temper it, and high enough for an effective transfer of heat from the die to the cooling medium. It has been found advantageous to cool the die not only during the time that it contacts the glass, but throughout its entire period of use. Since in tempering a glass sheet the most important factor is the rate of heat transfer therefrom during the first few seconds that the glass is contacted by the die, the mode of operating the contact tempering die of this invention is such as to maintain a sufficiently low temperature of the overall die construction before it contacts the glass to achieve the desired high rate of heat extraction at the beginning of the tempering cycle. In view of this mode of operation, the die acts not only as the conductor of heat from the glass to the ultimate cooling medium, but also as an intermittent sink for the heat. Thus, it is not only the thermal conductivity of the metal-filled elastomer that is advantageously being used by this invention, but also its high volumetric heat capacity.

The metal-filled, relatively deformable elastomeric material utilized in the die construction of this invention is one which, in general, should contain between 10% to 70% by volume of copper powder. The copper powder serves both as the heat sink in the elastomeric material and as a means of increasing the thermal conductance of the material. In preference, the elastomer portion of the elastomeric material is generally soft silicon rubber and the copper powder contained therein is a powder material consisting essentially of discrete particles of copper having a diameter of from 4 to 10 microns.

In a preferred construction the elastomeric material was formed so as to consist of 50% by volume, 90% by weight, of spherical copper powder particles having a diameter of 4 to 10 microns. The balance of the elastomeric material was a dielectric gel typified by a gel known as "Sylgard 51" manufactured by the Dow-Corning Corporation. This material is a soft silicon rubber that can be vulcanized at room temperature and has good chemical stability at elevated temperatures. Generally, this material can be described as a soft, thermally stable elastomer.

The thermal conductivity of the preferred elastomeric material in its metal-filled condition was measured to be about 1 B.t.u.-ft./hr. (ft.$^2$) ° F. so that a ¼ inch thick layer of the material has a conductance of about 48 B.t.u./hr. (ft.$^2$) ° F. A feature of this rather dense material is its high volumetric thermal or heat capacity. Such a material has been utilized to temper glass sheets as thin as 0.090 inch. In other words, the elastomeric material is capable of absorbing heat rapidly, so as to generate a temperature differential even in an extremely thin piece of glass. Thus, when the glass sheet is cooled through its strain point and the critical temperature range associated with tempering, effective compression and tension forces are generated therein to produce a high temper in the glass sheet.

A ¼ inch thickness of this material containing the 50% by volume metal was measured for hardness on the durometer scale. A result could not be achieved from such a measurement because the material was still too deformable to be measured on this scale.

The layer of glass cloth fabric utilized on the outer surface of the metal-filled, elastomeric material is utilized to protect the surface of the glass to be tempered from marking. The glass cloth utilized in the preferred die construction has a layer thickness of 0.004 inch. Typical glass cloth fabrics for this purpose are obtainable from the J. P. Stevens and Co. Inc. as fabric types 116 and 120.

In a normal tempering operation, the glass sheet is heated to a temperature of approximately 1250° F., and positioned between the two dies containing the elastomeric material. At the beginning of the tempering cycle, which in a preferred embodiment lasted 30 seconds, the elastomeric material had an initial temperature of 300° F. which is a suitably low initial temperature. The platen supporting the elastomeric material of each die was formed from an aluminum plate of ½ inch thickness. The glass cloth on the surface of the elastomer was 0.004 inch in thickness. The dies were closed on the glass sheet to apply a pressure of 2.5 p.s.i. on the surface of the glass sheet. The dies were closed on the glass sheet for 15 seconds of the 30-second period of time. In this short period of time, the glass sheet was cooled through its strain point and critical temperature range to a temperature of about 700° F.

The ⅛ inch glass sheet produced in the tempering operation had a surface compression of approximately 18,000 p.s.i. and the center tension of approximately 8500 p.s.i. The temper produced over the entire surface of the glass sheet was substantially uniform because the material causing the transfer of heat from the glass sheet uniformly contacted the glass surface throughout its entire extent.

If it is desired to produce an article having various degrees of temper in various zones thereof, the present invention readily lends itself to the accomplishment of this by spatially varying the local rates of heat transfer over various parts of the glass about to be tempered. This may be accomplished in several ways. Thus, it is possible to alter the composition of the elastomeric material in certain zones of the dies since changes in the amount of copper or other metal filling used will affect both the thermal conductivity and volumetric specific heat of the die covering in the selected zone of the glass. In the drawings, FIG. 2 represents a more dense metal filling in the elastomeric material than that which is shown in FIG. 1. Alternatively, the local rate of heat flow may also be modified by locally changing the thickness of the glass cloth used as an outer covering of the die, such a structure being shown in FIG. 3. Since in the ordinary manner of using this invention the glass cloth covering is chosen so as to present only a minimal resistance to heat flow, local thickening of the glass cloth covering, as for example, by the provision of a second layer below the outer covering, will affect the locally produced degree of temper through a reduction of the net local conductance between the glass and the body of the die.

Another advantage of the die construction of this invention is that it permits the bowing and tempering of a flat glass sheet in a single step. In his case a pair of dies are utilized, one die contacting the front of the glass sheet and the other die contacting the rear of the glass sheet. Each die has a different but uniform thermal conductance over its entire lateral extent. The different thermal conductances of the material may be made by changing the amount of metal fill in the material or by utilizing a different thickness of glass cloth over the entire extent of its surface area. When the paired dies are closed about a glass sheet to be tempered, the unequal cooling of the two sides of the glass sheet quenched between such dies will produce asymmetric temper stresses. Upon release of the glass from the dies, these stresses will cause the glass to bow into a substantially spherical surface. Both experimentally and theoretically it has been shown that the stress remaining in the now curved glass is determined by the average quenching rate produced by the two dies. The curvature of the glass, on the other hand, is governed by the difference of the two quenching rates of the dies.

Still another advantage of the die construction of this invention is that it permits the bending and tempering of a flat glass sheet in a single step. In this case a pair of dies which have matched, curved surfaces are utilized, one die contacting the front and the other die contacting the rear of the glass sheet. When the paired dies are closed about a glass sheet, the sheet is bent to a final configuration simultaneously with its tempering.

The invention disclosed will have many modifications which will be apparent to those skilled in the art in view of the teachings of this specification. It is intended that all such modifications which fall within the true spirit and scope of this invention be included within the scope of the appended claims.

We claim:

1. A die for a glass tempering apparatus comprising: a supporting platen, a layer of metal filled, relatively deformable, elastomeric material secured to said platen, said layer containing between about 10% to 70% by volume of said metal, said metal of said filled elastomeric material being formed of a material which has both a high thermal conductivity and a high volumetric specific heat; and a thin, heat resistant material covering the surface of said elastomeric material which is brought into contact with the glass during the tempering operation.

2. A die for a glass tempering apparatus comprising: a supporting platen, a layer of metal filled, relatively deformable, elastomeric material secured to said platen; said layer containing between about 10% to 70% by volume of said metal and a thin heat resistant material covering the surface of said elastomeric material which is brought into contact with the glass during the tempering operation.

3. The die for a glass tempering apparatus as defined in claim 2 wherein the thickness of said heat resistant material covering the surface of said elastomeric materials is varied over the area of said elastomeric material.

4. The die for a glass tempering apparatus as defined in claim 2 wherein the amount of metal fill of said metal filled, elastomeric material is varied over the area of said elastomeric material.

5. A die for a glass tempering apparatus comprising: a rigid supporting platen; a layer of metal filled, relatively deformable elastomeric material secured to said rigid platen, said layer containing between about 10% to 70% by volume of copper powder; and a thin glass cloth fabric covering the surface of said elastomeric material which is brought into contact with the glass during the tempering operation.

6. The die for a glass tempering apparatus as defined in claim 5 wherein the elastomer portion of said elastomeric material is a soft silicon rubber.

7. The die for a glass tempering apparatus as defined in claim 6 wherein the copper powder in said elastomeric material consists essentially of the discrete particles of copper having a diameter of 4 to 10 microns.

8. The die for a glass tempering apparatus as defined in claim 7 wherein said metal filled elastomeric material has a density of approximately 300 pounds per cubic foot, a thermal conductivity of about 1 B.t.u.-ft./hr. (ft.$^2$) ° F. and a volumetric specific heat of about 20 B.t.u./ft.$^3$ (° F.).

9. The die for a glass tempering apparatus as defined in claim 5 wherein the thickness of said glass cloth fabric covering said layer of metal filled, elastomeric material is varied over the area of said elastomeric material.

10. The die for a glass tempering apparatus as defined in claim 5 wherein the amount of metal fill of said metal filled, elastomeric material is varied over the area of said elastomeric material.

11. The improvement in solid contact glass tempering apparatus which comprises: using a pair of dies as defined in claim 2, one die contacting the front and the other die contacting the back of the glass sheet to be tempered during the tempering operation.

12. The improvement in solid contact glass tempering apparatus as defined in claim 11 wherein one die has a greater amount of metal fill in said metal filled, elastomeric material than the other die thereby to increase the capability of said one die for extracting heat from the surface of the glass sheet said one die contacts whereby a flat glass sheet tempered between the pair of dies will assume a bowed configuration after the tempering operation.

13. The improvement in solid contact glass tempering apparatus as defined in claim 11 wherein one die has a greater thickness of glass cloth fabric overlying said metal filled, elastomeric material than the other die thereby to decrease said one die's capability of extracting heat from the surface of the glass sheet said one die contacts whereby a flat glass sheet tempered between the pair of dies will assume a bowed configuration after the tempering operation.

14. The improvement in solid glass tempering apparatus as defined in claim 11 wherein the dyes have matched, curved surfaces whereby a flat glass sheet tempered between the pair of dies is also bent to a final configuration.

References Cited

UNITED STATES PATENTS

| 2,799,793 | 7/1957 | De Cain. | |
| 3,333,934 | 8/1967 | Seymour | 65—104 |
| 3,459,521 | 8/1969 | Nedlec | 65—104 |

ROBERT L. LINDSAY, JR., Primary Examiner

U.S. Cl. X.R.

65—114, 115, 348, 356; 165—185